June 16, 1931. B. LOEFFLER 1,810,360
CLUTCH DISK CONSTRUCTION
Filed Sept. 12, 1929  2 Sheets-Sheet 1

Inventor:
Bruno Loeffler
By his Attorneys
Redding, Greeley, O'Shea & Campbell

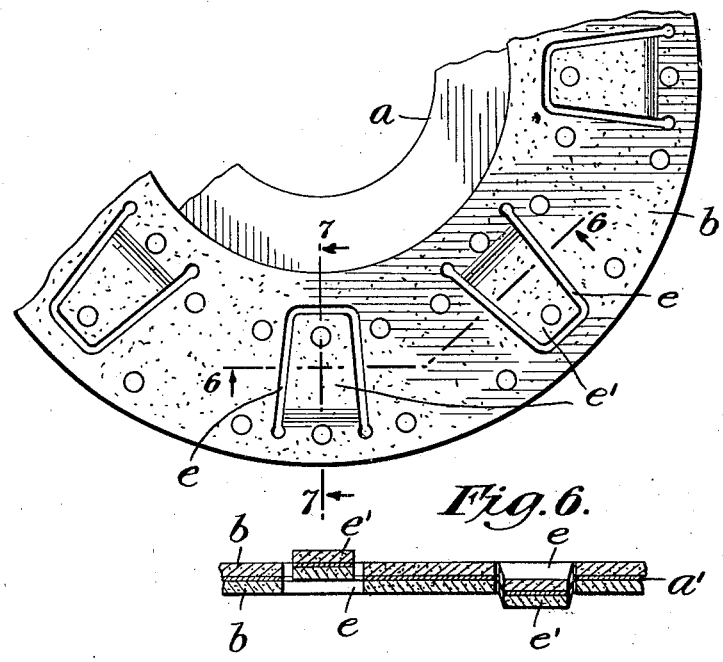
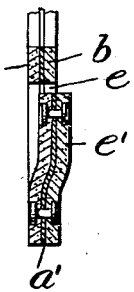
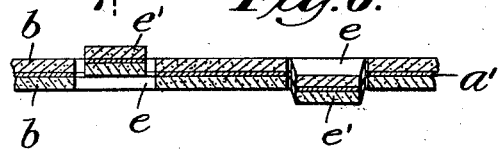
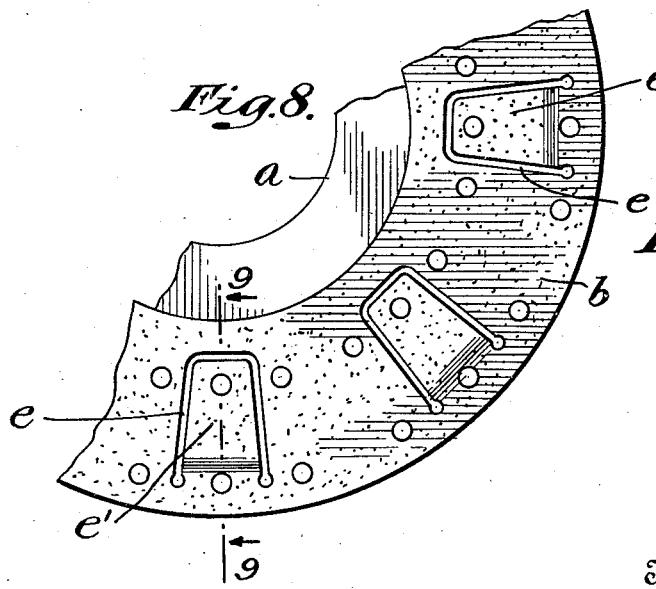
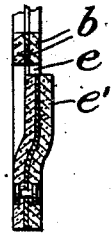

Patented June 16, 1931

1,810,360

UNITED STATES PATENT OFFICE

BRUNO LOEFFLER, OF PLAINFIELD, NEW JERSEY, ASSIGNOR TO INTERNATIONAL MOTOR COMPANY, OF NEW YORK, N. Y., A CORPORATION OF DELAWARE

CLUTCH DISK CONSTRUCTION

Application filed September 12, 1929. Serial No. 392,077.

The present invention relates to clutches and embodies, more specifically, an improved form of clutch in which the elements thereof are constructed in such manner that a more smooth and effective engagement is had than in existing constructions. The grabbing of clutch plates, in engagement thereof, is a well known disadvantage in operation, such grabbing imposing severe stresses on the mechanism, as well as resulting in highly uncomfortable operation of motor vehicles. The friction plates of a clutch are frequently of such nature that grabbing is difficult to prevent and the resulting operation of the clutch highly uncertain and unsatisfactory. With the foregoing in mind, the present invention seeks to provide a clutch disk construction which is of such character that a smooth engagement of the elements thereof is insured regardless of the conditions under which the clutch operates.

An object of the invention, therefore, is to provide a clutch construction which insures smooth engagement of the disks thereof.

A further object of the invention is to provide a clutch disk construction of the above character, the parts of which are simple in construction and easily manufactured.

Further objects, not specifically enumerated above, will be apparent as the invention is described in greater detail in connection with the accompanying drawings, wherein:

Figure 5 is a segmental plan view showing a still further modified form of disk construction.

Figure 6 is a view in section, taken on the line 6—6 of Figure 5, and looking in the direction of the arrows.

Figure 7 is a view in section, taken on the line 7—7 of Figure 5, and looking in the direction of the arrows.

Figure 8 is a segmental plan view of a still further modified form of the invention.

Figure 9 is a view in section, taken on the line 9—9 of Figure 8, and looking in the direction of the arrows.

Figure 1:
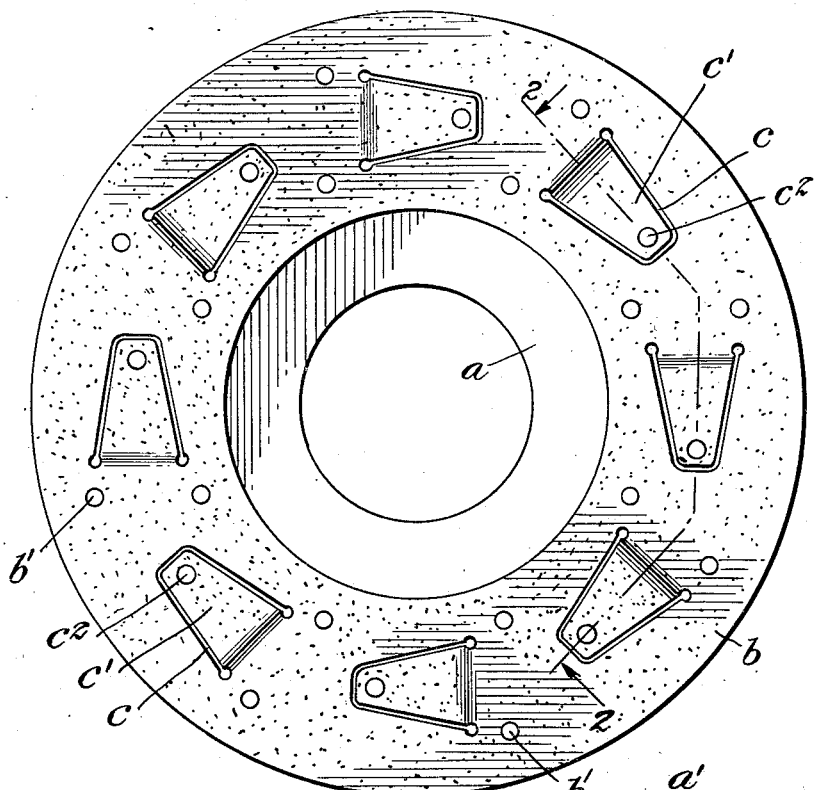
Figure 1 is a plan view of a clutch disk constructed in accordance with the present invention.
Figure 2:
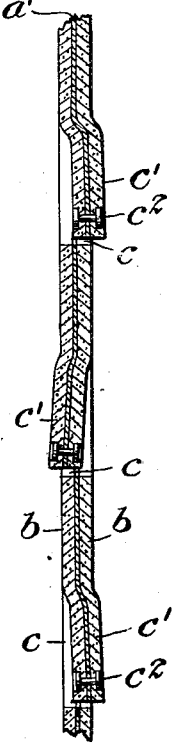
Figure 2 is a view in section, taken on the line 2—2 of Figure 1, and looking in the direction of the arrows.

Referring to the above drawings, particularly Figures 1 and 2, $a$ designates an annular spider which is adapted to be connected to one of the movable elements of the clutch and carries an annular plate $a'$. This plate is preferably formed of spring material in order that projecting portions, described hereinafter may have the desired yielding quality. Upon opposite sides of the plate $a'$, friction disks $b$ are mounted, these disks being secured to the plate $a'$ by rivets $b'$.

At spaced intervals around the disks and plate, and in the plane thereof, grooves $c$ are stamped. These grooves, in Figures 1 and 2, are shown as being generally V-shaped, leaving a similarly shaped projecting portion $c'$ which is pressed outwardly, as shown in Figure 2, in such manner that it is out of the plane of the disks and plate. The portions $c'$ have been shown as laterally projecting on opposite sides of the disks and plate, and the portions of the friction disks are secured to the portions of the plate, in such projecting parts by means of suitable rivets $c^2$.

In operation, the projecting portions $c'$ first engage the adjacent clutch plates which are forced into engagement with the disks and an initial drag results which becomes greater and greater as the pressure upon the plates increases. Thus, the engagement is effected gradually and increases from a minimum to a maximum at the time of complete locking of the elements of the clutch when the plates are in engagement with the disks $b$.

Figure 3:
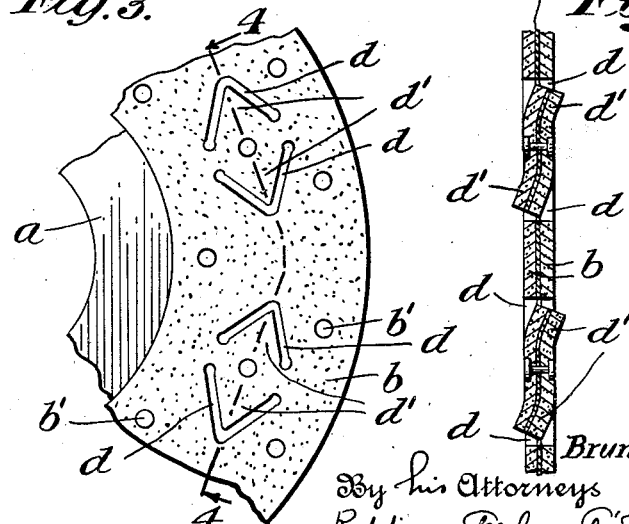
Figure 3 is a segmental plan view showing a clutch constructed in accordance with the present invention but in a modified form from that shown in Figures 1 and 2.
Figure 4:
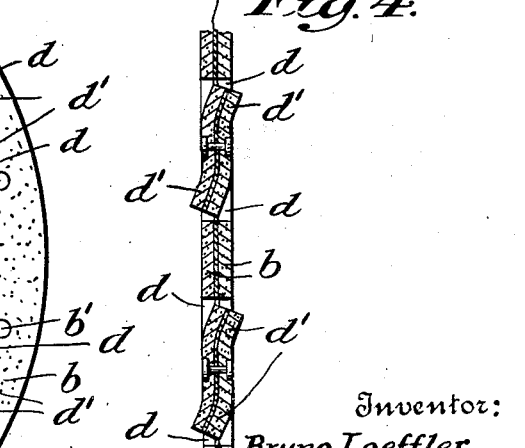
Figure 4 is a view in section, taken on the line 4—4 of Figure 3, and looking in the direction of the arrows.

In the construction shown in Figures 3 and 4, the plate $a'$ is formed with pairs of inverted V-shaped slots $d$ which are spaced back to back, thus forming oppositely extending V-shaped projections $d'$. One of the projections is bent outwardly upon one side of the plate $a'$ and the other is bent outwardly on the other side of the plate, as clearly shown in Figure 4. The characteristics attributed to the construction shown in Figures 1 and 2, are present in this construction as will be evident upon a brief inspection thereof.

In the construction shown in Figures 5, 6 and 7, slots $e$, similar in form to the slots $c$, are formed in the plate $a'$, the axes of the slots lying generally in radial directions with respect to the axis of the plate $a'$. Alternate projecting portions $e'$, formed by the slots $e$ extend in opposite directions to distribute evenly the engaging pressure of the projecting portions $e'$ in radial directions with respect to the disks. Additionally, alternate projecting portions $e'$ project upon opposite sides of the plate $a'$ in order that both sides of the disks may be engaged with equal effect.

In the construction shown in Figures 8 and 9, the slots are similar to those shown in Figures 5, 6 and 7, with the exception that the projecting portions $e'$ formed thereby, all project inwardly.

While the invention has been described with specific reference to the construction shown in the acompanying drawings, it is not to be limited, save as defined in the appended claims.

What I claim is:

1. In a clutch construction, an annular plate, friction members secured to the plate at opposite sides thereof, and resilient portions stamped out of the plate and members and projecting out of the planes thereof, said resilient portions projecting upon opposite sides of the plate.

2. In a clutch construction, an annular plate, annular friction members secured to the plate at opposite sides thereof, and yielding means formed by slotted portions of the plate and members to cause a portion of the members to project out of the planes of the members.

This specification signed this 6th day of Sept. A. D. 1929.

BRUNO LOEFFLER.